Nov. 14, 1961　　　A. I. BOYER　　　3,008,405
PORTABLE ROASTING BROILER UNIT
Filed June 9, 1958　　　2 Sheets-Sheet 2
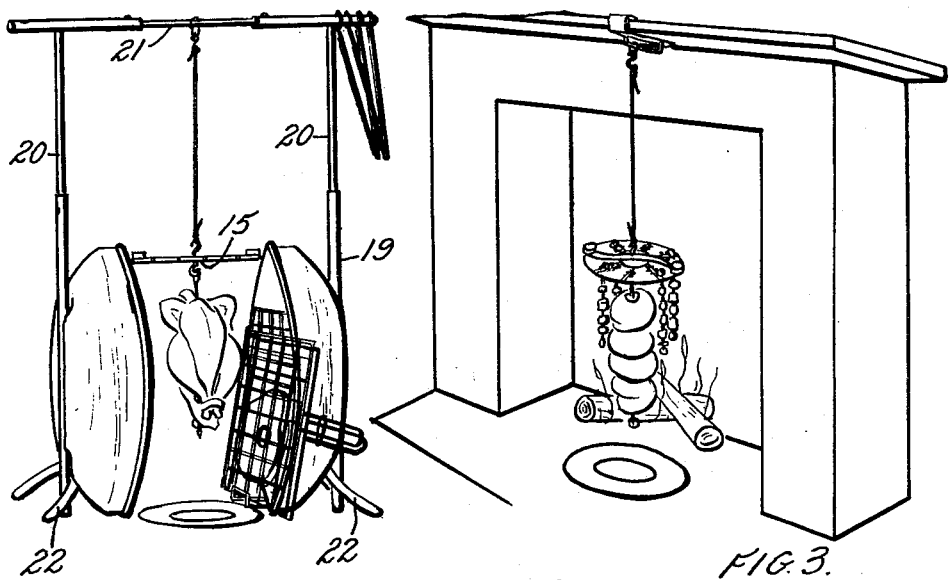
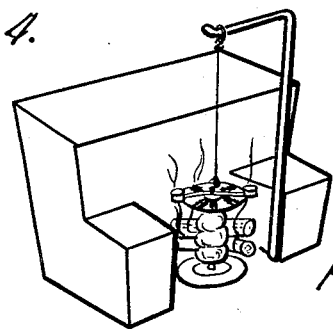
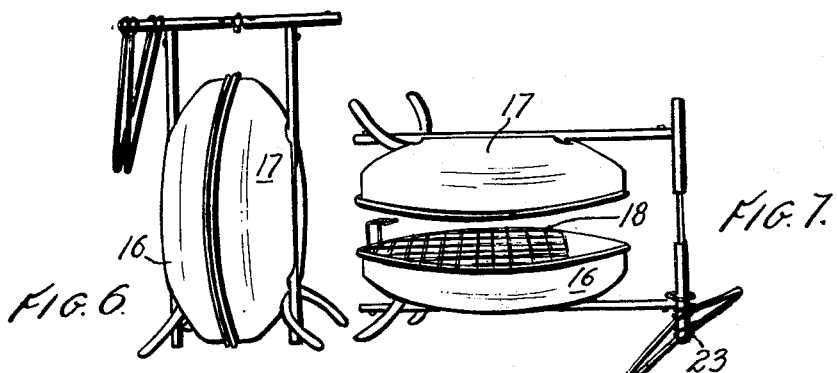
INVENTOR.
ARTHUR I. BOYER
BY
ATTORNEY

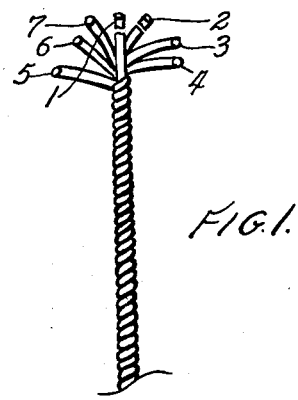
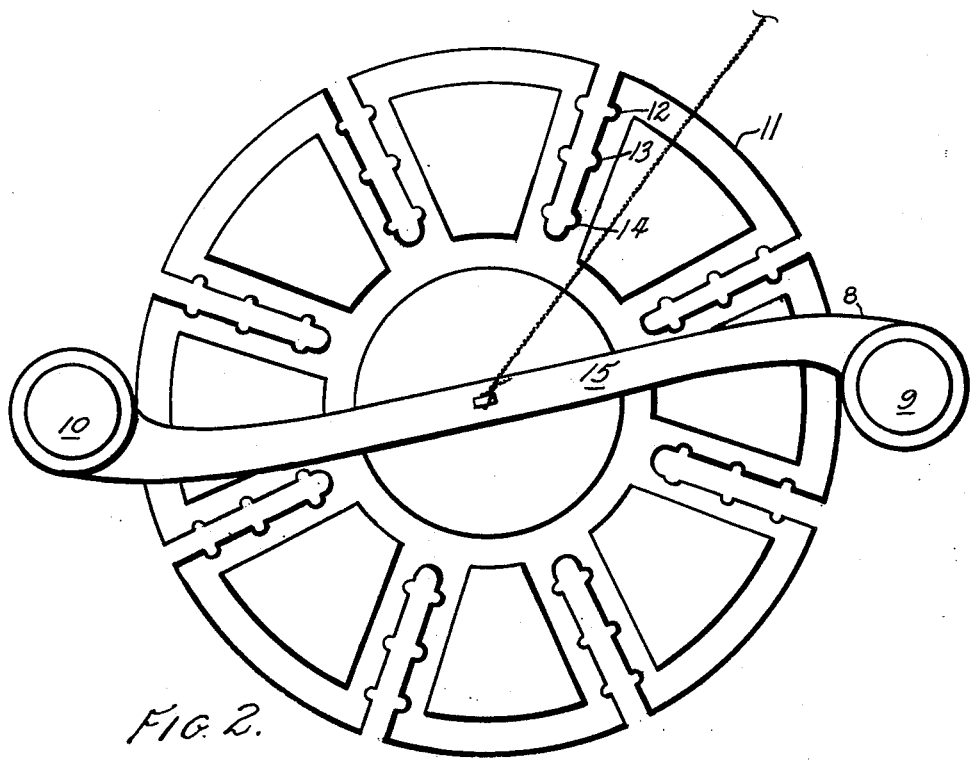

United States Patent Office

3,008,405
Patented Nov. 14, 1961

3,008,405
PORTABLE ROASTING BROILER UNIT
Arthur I. Boyer, New York, N.Y., assignor to
Lonnie Boyer, New York, N.Y.
Filed June 9, 1958, Ser. No. 740,680
1 Claim. (Cl. 99—421)

This invention is for a simple but substantial improvement in one of the oldest cooking utensils known to man, namely a spit. Historically a spit consists of a flyer and skewer suspended by a stout linen thread before the glowing coals or open fire. While in the fascinating poetry of swirling motion, squabs, quails, turkeys and roasts were succulently cooking, a problem existed for centuries in maintaining of new threads which obviously were sensitive to heat and often burned out. There was also a problem in having a cook stand by to keep the spit in motion. As far back as the 17th century a device was used known as a dog-spit where a pup, popularly known as a spit-pup was induced to thread the trundle and turn a wheel which in turn roasted the venison or other food.

But, a problem existed in developing a spit which would be portable and easily carried to the various places where it is possible to find a spot for cooking food. Until applicant's invention those who recognized the desirable utilization of roasting by the spit method were unable to find such a method available in a portable unit. A second problem involved finding a substitute for the linen thread which would enable the flyer from which the food is suspended to be loaded by the rotable weight and unloaded by the reversing of the rotation under the influence of the weight of the food and an occasional touch of the finger. No single wire of any known character had adequate torsional properties to provide for the continuous twirling and untwirling motion necessary to cook the food. Applicant has contributed the concept of a seven-strand preformed steel cord with a small percentage of chrome and nickle which enabled him to rotate food with a cord approximately 18 inches long. This is a notable achievement because no linen thread, which as mentioned, was used historically, was ever adequate to rotate food over this relatively short distance.

Applicant so far as he is aware, is the first person to utilize a seven-stranded wire to attach the spit. As a result of this concept he has been able to produce the total invention about to be described in the form of a versatile portable cooking unit which may operate not only as a spit but also as a normal roasting unit.

This unit is designed to provide an all-purpose, light, portable, self-contained, charcoal or wood-burning grill capable of roasting, broiling, barbecuing or baking vertically, frying, stewing, steaming or smoke-cooking horizontally. This new type of portable spit is hung 18 inches or less from the handle of a carrier unit where between two matchable bowls, one carrying fuel, the other a heat-reflector bowl. The flyer unit to which the food to be roasted is attached, winds and unwinds under the influence of the cooking food. This touch is applied as the roasting starts and intermittently two or three times during the roasting process. At the conclusion of the roasting or in the alternative, the spit unit may be unhooked, the fuel unit turned horizontally and a roaster is available with a heat-reflector which may be located over it at any convenient distance. Not only is this useful for alternate cooking but of course it is possible to broil in normal fashion vegetables, heat water in the reflector for coffee and then heat water in the reflector for washing dishes or cutlery. Because of the shape of the bowls where the open faces come together as securely as an old-fashioned hunting watch, it is possible not only to store within this area the skewers, the wire, the hooks but also food and other auxiliary articles along, of course, with the briquettes or chips constituting the fuel.

More specifically the above noted and other features will be understood more clearly and fully from the following detailed description when read in conjunction with the accompanying drawings wherein FIG. 1 is a cross-section showing the seven strands of steel wire and FIG. 2 a top section view of the weighted flyer showing the radial locking areas for the skewers. FIGS. 1 and 2 show substantially an independent cooking unit and FIG. 3 shows the spit in an extended vertical position. FIG. 4 shows the portable unit with the bowls in an extended vertical position for roasting, broiling or baking. FIG. 5 shows the spit unit suspended before an outdoor fireplace. FIG. 6 shows the portable unit in a closed position and FIG. 7 illustrates the cooking unit in a horizontal position and the utilization of the frame of the supports and the auxiliary legs to stabilize the unit.

Referring now to the drawings, FIG. 1 shows 1 a core of steel wire preferably of an 18–8 grade stainless steel, in combination with approximately 20% chrome and not over 15% nickel content, with addition of not over 3% molybdenum and strands 2, 3, 4, 5, 6, and 7.

This cord is looped or hooked at the upper end or at either end with a ring mount shown in FIG. 4 or on such a member shown in FIGS. 3 and 5. The flyer unit FIG. 2 is shown at 8 to consist of an S-shaped unit having weighted ends raised at 9 and 10, this unit being intermittently associated with an open faced disk identified at 11. It will be noted that this disk is radially perforated in multiple places illustrated at 12, 13, and 14. Through these perforations are skewers which may be from 1 to 24 and upon which are hung various types of food or meat adapted for roasting. Through the center 15 of the flyer unit in association with the torsional cord is a hooked member 15, more readily seen in FIG. 4. This unit alone when suspended becomes a self-operating vertical spit of extraordinary versatility and needs only a touch of the finger to get it going from 15 minutes to two hours with an occasional touch now and then over the longer period. Obviously with a heavy roast a longer length of wire may be used.

As shown in FIG. 6, 16 and 17 are a pair of matchable bowls, one bowl is a steel grid 14 substantially across the face of the bowl leaving an opening for the insertion of fuel. The other bowl is hollow and, of course, provides in a closed position, space for the carrying of the auxiliary cooking utensils and food. It will be noted as shown in FIG. 4 that each of these bowls is integral with a plurality of uprights 19 which have associated telescopic extensions 20. The right angle extension of members 20 forming in association with telescopic handle 21 a carrying frame for the unit. U-shaped members 22 extending downward form leg supports for the unit. Auxiliary U-brackets 23 are swiveled over the frame member and constitute supporting legs when the fuel bowl is placed in a horizontal position by a simple act of tipping the unit. When the unit is in the position shown in FIG. 7 the unit becomes a roasting unit and in this position it is possible to broil in front of and against coals rather than over the coals if that were desired. Otherwise the unit operates as a normal outdoor cooking grill.

*Operation*

In operation food, fuel, spit unit and auxiliary supplies are packed within the two bowls, and then readily closed by simply pushing the frame members together. The unit is now in the carrying position shown in FIG. 6. From this point on the versatility and uniqueness of the unit as a roasting or broiling unit is further apparent. In the first place if one wishes to cook by roasting in front of an outdoor fire, or even indoor fireplace as the case may be, all that is necessary is that the uprights be grasped and the unit opened. The flyer and torsional cord unit may be suspended from a hook or any type of convenient purchase. It could if desired, be swung from the apex of three poles, or a bracket such as shown in FIGS. 3 and 5. The entree is loaded on the fastening member directly beneath the flyer and supplementary foods are fastened through the skewers which in turn are locked through the radial areas in the flyer and may be quickly reversed to insure even cooking, top and bottom. A plate or pan is usually placed beneath the roasting food to catch the natural juices extruded by the heat, and available for basting to give unique added flavor to the food. If the fuel bowl of the unit is to be used rather than an open fire all that is necessary is the insertion of a wad of paper and the usual chips or briquettes through the opening over the grid. The spit unit is hung from the loop member on the handle frame by the torsional cord approximately 18" long, and the food carrying member hooked on the under side of the flyer. A touch of the match and a touch of the finger against the stranded wire and the slow winding and unwinding begins as the steel strand is loaded by the rotatable weight and unloaded by the reversing of the rotation under the influence of the same weight and intermittent finger touches as inertia approaches. When roasting has been completed the spit may be unhooked and the fuel reflector tipped to a horizontal position where, over the heat, vegetables or other foods may be prepared in the normal fashion. In addition, the other reflector bowl may be removed, water heated and used to wash the utensils. Finally, all utensils and components may be assembled in the bowls, and then closed together in a carrying position as compact as an umbrella as well illustrated in FIG. 6.

What is claimed is:

In a combination barbecue spit and broiler unit a pair of bowl members having their open portions facing each other, one bowl member being heat reflecting, the other bowl member having a fuel area partially covered by a permanent grid, each of said bowl members having an external channel in the bottom portion thereof, a first tubular member integrally mounted through each said channel in each of the bowl members, a rod telescopically mounted in each tubular member, and integral U-shaped leg member downwardly extending from each tubular member to a ground or floor surface, a telescopic handle transversely mounted at the free ends of said rods and comprising a second tubular member attached to each rod at a normal angle thereto and a rod telescopically mounted in said second tubular members, a ring attached to the said last mentioned rod, a flexible, suspendible multi-stranded steel cord, the upper end of which is attached to said ring when the bowl members are spaced apart from each other for spit cooking and the first mentioned tubular rods are extended in a vertical position with the U-shaped legs engaging the floor, a flyer attached to the lower end of said cord, a fastening member attached to the flyer to support food intermediate the bowl members and arranged to move continuously in alternate rotating paths as the cord winds in one rotary direction and unwinds in another, a pair of laterally extending brackets connected to one of the said second tubular members and adaptable to cooperate with one of the U-shaped leg members to stabilize the unit when the cord and flyer members have been removed, and the unit has been tipped to a position where the fuel bowl is parallel to the ground or floor in position for broiling as distinguished from spit cooking and the brackets rest on the surface of the ground or floor.

References Cited in the file of this patent

UNITED STATES PATENTS

| | | |
|---|---|---|
| 363,519 | Houston | May 24, 1887 |
| 868,264 | Guillaume | Oct. 15, 1907 |
| 905,684 | Fowle | Dec. 1, 1908 |
| 2,573,211 | Manzler | Oct. 30, 1951 |
| 2,573,988 | Saltzberg | Nov. 6, 1951 |
| 2,666,426 | Pollard | Jan. 19, 1954 |

FOREIGN PATENTS

| | | |
|---|---|---|
| 1,032 | Great Britain | Jan. 29, 1773 |
| 6,770 | Great Britain | Mar. 9, 1901 |